Feb. 19, 1957
F. W. SUHR
2,782,351
ALTERNATING CURRENT MOTOR CIRCUIT
Filed Dec. 9, 1954
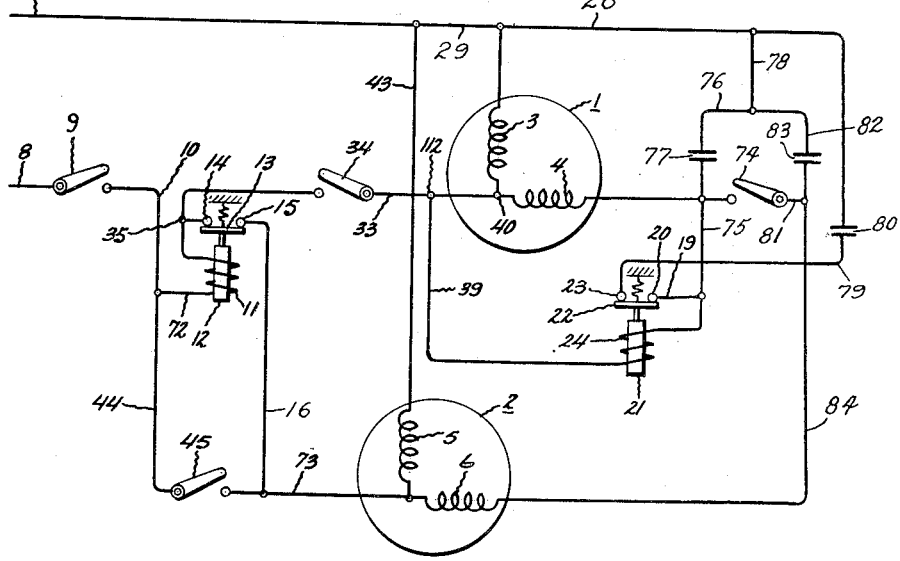
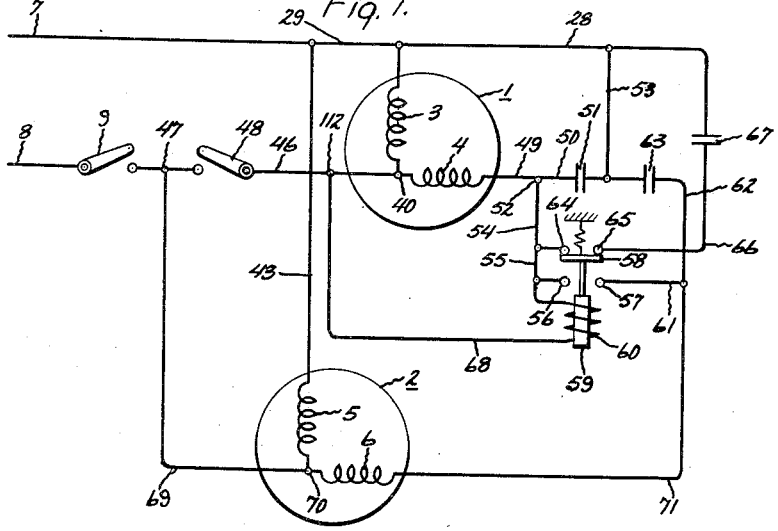
Inventor:
Fred W. Suhr,
by Robert G. Irish
His Attorney.

United States Patent Office 2,782,351
Patented Feb. 19, 1957

2,782,351

ALTERNATING CURRENT MOTOR CIRCUIT

Fred W. Suhr, Fort Wayne, Ind., assignor to General Electric Company, a corporation of New York Application December 9, 1954, Serial No. 474,129

7 Claims. (Cl. 318—103)

This invention relates to dynamoelectric machines, and more particularly to circuits for the operation of capacitor type alternating current motors.

There are many instances where it has been found most desirable to utilize a pair of alternating current motors connected in parallel. This is particularly true in the field of refrigeration, where one of the motors is utilized to run a refrigerator compressor while the other motor is utilized for a fan. The motors, in such an application, will either be run together or else the fan motor will run alone, for instance, where it is desired to move the air but no further cooling thereof is needed. It is well known that the utilization in connection with an alternating current motor of a capacitor in series with one winding thereof can increase its efficiency considerable, and, in addition, will correct the power factor of the motor to a degree dependent on the amount of the capacitor. This feature is particularly desirable in connection with air conditioners because of the fact that their effectiveness will vary noticeably with the power factor for a specified input current. In addition, the limitations imposed by home wiring make it desirable to maintain the current requirements at as low a value as possible, and the power factor correction will also help to effect this purpose. It is, however, well known that a capacitor is an expensive element, where it must be designed for use over long periods of time, and that its use increases the cost of the apparatus considerably. Where two motors have been used, it has in the past been necessary to provide two capacitors in order to achieve the desired effect. It will, of course, be clear that it is highly desirable to obtain the advantages of a capacitor connected with each motor, without being subjected to the expense of two separate capacitors each usable only for the motor with which it is associated. In addition, it will be clear from the foregoing that quite frequently one of the two motors (in refrigeration, generally the compressor motor) will draw more current than the other; in order to prevent overloading the wires in homes by starting of both motors together, it is frequently desirable to effect the starting of one motor and to prevent the starting of the other until the first has substantially come up to speed.

It is, therefore, an object of this invention to provide an improved circuit for alternating current motors incorporating the advantageous features set forth above.

Further objects and advantages of this invention will become apparent and the invention will be better understood by reference to the following description and the accompanying drawing, and the features of novelty which characterize this invention will be pointed out with particularity in the claims annexed to and forming a part of this specification.

In one embodiment, this invention provides a pair of alternating current motors connected for parallel operation, each having a main winding and an auxiliary winding. Means are provided to connect the two motors across a source of alternating current power, the means being adapted also to connect the second motor alone across the source. A run capacitor has two parts connected in parallel. Both parts are in series with both auxiliary windings during running operation of both motors, but when the second motor alone is connected across the source the second part only of the capacitor is connected in series with the auxiliary winding thereof.

In the drawings,

Figure 1 is a schematic illustration of a first embodiment of the improved circuit of this invention; and Figure 2 is a schematic illustration of another embodiment of this invention.

Referring now to Figure 1 of the drawings, there is shown a pair of alternating current motors 1 and 2. Motor 1, which may be of the squirrel cage induction type, has a main winding 3 and an auxiliary winding 4 while motor 2, which may also be of the squirrel cage induction type, has a main winding 5 and an auxiliary winding 6. A pair of lines 7 and 8 are adapted to be connected to a source of alternating circuit power (not shown) with a switch 9 arranged in line 8. Line 8 is joined to a line 46 at 47, line 46 containing a switch 48. Line 46 extends into motor 1 and is joined to the windings 3 and 4 at 40. Winding 3 is the main winding and is connected across line 46 and line 29. Auxiliary winding 4 is connected through a line 49 to a line 50 at point 52, line 50 having connected therein a run capacitor 51. This portion of the circuit then continues through line 53 back through lines 28, 29, and 7. However, a circuit will also be completed through line 54 and a pair of normally closed contacts 64 and 65 through a bridging contact 58 of relay 59 which has coil 60. Contact 65 is connected to line 66 which contains a starting capacitor 67. Line 66 is connected at its other end to line 28.

At a predetermined degree of energization of coil 60 of relay 59, contacts 64 and 65 are caused to open and normally open contacts 56 and 57 are at that time connected through bridging contact 58. Thus the circuit through starting capacitor 67 is interrupted while a new circuit through line 55, contacts 56 and 57, line 61, line 62 containing run capacitor 63, and line 53 is established. Capacitors 51 and 63 may be constructed as a single divided capacitor if so desired.

Coil 60 of relay 59 forms part of a line 68 which is joined at one end to point 40 in motor 1 and at the other end to line 55.

Motor 2 is connected to line 8 by means of a line 69 which joins the windings 5 and 6 at 70. Winding 5 is connected across line 69 and line 7 by a line 43. Winding 6, however, is connected through a line 71 to line 62.

When it is desired to operate motors 1 and 2 together, switches 9 and 48 will be closed. Current will then pass through line 8 with switch 9, and line 46 with switch 48, to motor 1. Current will then pass through main winding 3 to line 29 and back through line 7. Two parallel paths in series with winding 4 are then provided, one through line 54, contacts 64 and 65, bridging contact 58, and line 66 including capacitor 67, and the other through line 49 to line 50 including capacitor 51 and to line 53. A return path is provided for both through lines 28, 29, and 7.

At a predetermined degree of energization of coil 60, the bridging contact 58 of the relay will descend and bridge contacts 56 and 57. Current will also have passed through auxiliary winding 4 and line 49 to line 50 including capacitor 51 and out through lines 53, 28, 29, and 7. However, the completion of a circuit across contacts 56 and 57 will provide a path for current to travel through lines 54 and 55, across the contacts 56 and 57, through line 61 to line 62 including run capacitor 63, and back through line 53 to lines 28, 29, and 7. It will thus be seen that in starting, capacitors 51 and 67 are in parallel relation with each other and in series with auxiliary winding 4, while during running capacitors 51 and 63 are in parallel relation with each other and in series relation with the winding 4.

It will be remembered that motor 2 is connected for operation at the same time as motor 1. The parallel connection of auxiliary windings 4 and 6 and main windings 3 and 5 will cause auxiliary winding 6 to be displaced from main winding 5 of motor 2 in the same manner that auxiliary winding 4 was displaced from main winding 3 of motor 1. It will be seen that this permits utilization of the phase displacement of the auxiliary winding 4 to achieve the same effect for auxiliary winding 6 without necessitating additional elements. In addition, as soon as motor 2 is connected for starting, the main winding 5 will be connected across the line as shown while the auxiliary winding 6 will be connected through line 71 to line 62 with capacitor 63, and through line 53 to lines 28, 29, and 7. The circuit for this motor will not be changed by movement of the relay 59. It will thus be seen that the invention provides an arrangement whereby a two part run capacitor is provided. During starting, one motor will utilize one part of the run capacitor and the start capacitor, while the other motor will utilize the other part of the run capacitor. During operation, the auxiliary windings 4 and 6 of the motors 1 and 2 respectively are in parallel with each other and in series with the parallel-connected capacitors 51 and 63. When motor 2 operates alone, only capacitor 63 is in series with the winding 6. It will be quite clear that this is particularly advantageous in circuits such as those provided for air conditioning purposes, where motor 1 may be the compressor motor and motor 2 may be the fan motor, and there may be much higher capacitance requirements for motor 1 to operate efficiently than for motor 2. By the circuit shown, motor 1 may be provided with the added capacitance needed without over-correcting motor 2, since motor 2 will only be provided with that part of the capacitance which it, in turn, needs when operated alone.

Referring now to Figure 2, the circuit illustrated therein will be described using the same numerals as in Figure 1 for like parts. As before, motors 1 and 2 are connected so that windings 3 and 5, and 4 and 6, respectively, are in parallel. A pair of lines 10 and 72 connect switch 9 in line 8 to the coil 11 of a relay 12 having a bridging contact 13 adapted to connect a pair of contacts 14 and 15. This relay is connected to motor 2 by a pair of lines 16 and 73 so as to control the operation of that motor. Coil 11 is responsive to the inrush of current to motor 1 upon starting thereof to open bridging contact 13 and thus keep motor 2 inoperative until motor 1 has substantially come up to speed with a consequent lessening of the current drawn from the line during starting. Returning to motor 1, the main winding 3 is connected across the source of power by a circuit which, starting at point 35, includes line 33 with switch 34 therein, the winding 3, and lines 29 and 7. A relay 21, having a coil 24, is connected to motor 1 by a line 39 which is joined to line 33 at point 112. The circuit through the relay coil 24 is completed through line 75, line 76 including running capacitor 77, and line 78, with the current then passing through lines 28, 29, and 7. Bridging contact 22 of the relay is biased to connect contacts 23 and 20 so as to complete a starting circuit for auxiliary winding 4 through line 75, line 19, contacts 20 and 23, and line 79 having therein start capacitor 80. The circuit is then completed through lines 28, 29, and 7. As the motor 1 comes up to speed, the voltage across winding 4 and coil 24 of relay 21 will rise and bridging contact 22 will be pulled out of engagement with contacts 20 and 23. This will consequently open the connection between auxiliary winding 4 and capacitor 80. Motor 1 will then run with auxiliary winding 4 in series with running capacitor 77 and, through line 81 and switch 74, another running capacitor 82 which is in parallel with capacitor 77 and may be constructed therewith as a single split capacitor, if so desired. Relay 12 was originally caused to open by the high current drawn by motor 1. As the motor 1 comes up to speed, the current will drop and the relay 12 will close, permitting current to pass through the windings 5 and 6 of motor 2. Main winding 5 is connected directly across the line while auxiliary winding 6 is connected through a line 84 to line 82 having capacitor 83 therein.

When it is desired to operate motor 2 without motor 1, switches 34 and 74 will be opened and a switch 45 contained in a line 44 which connects lines 10 and 73 may be closed. It will of course be apparent, as before, that in instances where motor 2 is so small relative to motor 1 that it will not draw enough current to open relay 12 even when it starts, line 44 with switch 45 may be dispensed with. However, if the motors should be made of approximately the same value, in other words if motor 2 should draw enough starting current to open relay 12, then it is advisable to provide a switch 45 to insure a continuous flow of current to motor 2 when it is operated alone. The motor 2 will then have winding 5 connected directly across the line as before and winding 6 connected to the line through capacitor 83. This relatively small capacitor will be the only one connected with the winding 6 because of the open position of switches 34 and 74. It will thus be seen that this circuit provides a second embodiment of an arrangement whereby a single run capacitor may be divided so that a motor having relatively high capacitance requirements for optimum efficiency will be able to utilize the entire capacitance for running purposes, while a second motor having low capacitance requirements for optimum efficiency will not be over-corrected when it is run alone since it will be connected with only the part of the run capacitor necessary to insure best performance. In addition to this, provision has been made to limit the amount of current passing through lines 7 and 8 by insuring staggered starting of the motors 1 and 2.

It will be seen from the foregoing descriptions that this invention provides in all cases split run capacitor means which are arranged to be connected in series with the auxiliary windings of both motors in the circuit, thereby avoiding the necessity for two entirely separate run capacitors to provide improved efficiency and power factor correction. It will also be observed that this invention may include means for staggering the starting of the motors when they are operated together so that in addition to the improved efficiency and improved power factor, the current drawn across lines 7 and 8 will be limited to a safe value.

While this invention has been explained by describing particular embodiments thereof, it will be apparent that improvements and modifications may be made without departing from the scope of the invention as defined in the appended claims.

What I claim as new and desire to secure by Letters Patent of the United States is:

1. In combination, first and second capacitor-run alternating current motors connected for parallel operation and each having a main winding and an auxiliary winding, phase displacing means in series with the auxiliary winding of said first motor, means arranged to disconnect said phase displacing means as said first motor comes up to speed, means adapted to connect said motors across a source of alternating current power, said last-mentioned means being further adapted to connect said second motor alone across said source, and a run capacitor having first and second parts, said first part being permanently connected in series with the auxiliary winding of said first motor, said disconnecting means being arranged to connect said second part in series with the auxiliary winding of said first motor and said first part in series with the auxiliary winding of said second motor when said disconnecting means disconnects said phase displacing means, said second part being connected in series with the auxiliary winding of said second motor.

2. In combination, first and second capacitor-run alternating current motors connected for parallel operation and each having a main winding and an auxiliary winding, means adapted to connect said motors across a source of alternating current power, said means being further adapted to connect said second motor alone across said source, and a run capacitor having first and second parts connected in parallel, both of said parts being connected in series with the auxiliary windings of both of said motors during operation thereof, said second part only being connected in series with the auxiliary winding of said second motor when it alone is connected across said source.

3. In combination, first and second capacitor-run alternating current motors connected for parallel operation and each having a main winding and an auxiliary winding, a start capacitor arranged in series with the auxiliary winding of said first motor, relay means having a coil connected across said first motor, two sets of contact means alternatively arranged to be engaged by said relay, one of said sets being arranged normally to connect said auxiliary winding and said start capacitor, said relay being arranged to disconnect said auxiliary winding and said start capacitor at a predetermined degree of energization, switch means adapted to connect said motors across a source of alternating current power, switch means adapted to disconnect said first motor only from said source, and a run capacitor having first and second parts, said first part being permanently connected in series with the auxiliary winding of said first motor, said second part being connected in series with the auxiliary winding of said first motor and said first part being connected in series with the auxiliary winding of said second motor when said relay reaches said degree of energization and engages said second set of contact means, said second part being further connected in series with the auxiliary winding of said second motor.

4. In combination, first and second capacitor-run alternating current motors connected for parallel operation and each having a main winding and an auxiliary winding, means adapted to connect said motors across a source of alternating current power, said means being further adapted to connect said second motor alone across said source, a run capacitor having first and second parts connected in parallel, both of said parts being connected in series with the auxiliary windings of said first and second motors during operation thereof, said second part only being connected in series with the auxiliary winding of said second motor during operation of said second motor alone, and means responsive to starting of said first motor and adapted to disconnect said second motor from said source during such starting.

5. In combination, first and second capacitor-run alternating current motors connected for parallel operation and each having a main winding and an auxiliary winding, phase displacing means in series with the auxiliary winding of said first motor, means arranged to disconnect said phase displacing means as said first motor comes up to speed, means adapted to connect said motors across a source of alternating current power, said last-mentioned means being further adapted to connect said second motor alone across said source, and a run capacitor having first and second parts connected in parallel, both of said parts being connected in series with the auxiliary windings of said first and second motors during operation thereof, said second part only being connected in series with the auxiliary winding of said second motor during operation of said second motor alone.

6. In combination, first and second capacitor-run alternating current motors connected for parallel operation and each having a main winding and an auxiliary winding, a start capacitor arranged in series with the auxiliary winding of said first motor, means arranged to disconnect said start capacitor when said first motor comes up to speed, means adapted to connect said motors across a source of alternating current power, said last-mentioned means being further adapted to connect said second motor alone across said source, and a run capacitor having first and second parts connected in parallel, both of said parts being connected in series with the auxiliary windings of said first and second motors during operation thereof, said second part only being connected in series with the auxiliary winding of said second motor during operation of said second motor alone, and means responsive to starting of said first motor and adapted to disconnect said second motor from said source during such starting.

7. In combination, first and second capacitor-run alternating current motors connected for parallel operation and each having a main winding and an auxiliary winding, a start capacitor arranged in series with the auxiliary winding of said first motor, relay means having a coil connected across said first motor, contact means connecting said auxiliary winding and said start capacitor and arranged to disconnect the same in response to operation of said relay, switch means adapted to connect said motors across a source of alternating current power, switch means adapted to disconnect said first motor only from said source, a run capacitor having first and second parts connected in parallel, both of said parts being connected in series with the auxiliary windings of said first and second motors during operation thereof, said second part only being connected in series with the auxiliary winding of said second motor during operation of said second motor alone, and relay means responsive to starting current of said first motor and adapted to disconnect said second motor from said source during such starting.

References Cited in the file of this patent
UNITED STATES PATENTS

| | | |
|---|---|---|
| 1,707,423 | Bailey | Apr. 2, 1929 |
| 1,828,724 | Yost | Oct. 20, 1931 |
| 1,944,080 | Lukens | Jan. 16, 1934 |
| 1,953,941 | Anderson | Apr. 10, 1934 |
| 2,158,887 | Sweet | May 16, 1939 |
| 2,178,373 | Kenny et al. | Oct. 31, 1939 |
| 2,208,395 | Scott et al. | July 16, 1940 |
| 2,208,396 | Scott | July 16, 1940 |
| 2,585,987 | Andrews | Feb. 19, 1952 |